United States Patent
Suzuki

(10) Patent No.: US 10,377,157 B2
(45) Date of Patent: Aug. 13, 2019

(54) PRINTING DEVICE, PRINTING METHOD AND RECORDING MEDIUM

(71) Applicant: CASIO COMPUTER CO., LTD., Shibuya-ku, Tokyo (JP)

(72) Inventor: Shigeto Suzuki, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/793,440

(22) Filed: Oct. 25, 2017

(65) Prior Publication Data
US 2018/0170080 A1    Jun. 21, 2018

(30) Foreign Application Priority Data

Dec. 21, 2016    (JP) .................................. 2016-247350

(51) Int. Cl.
*B41J 3/36*       (2006.01)
*B41J 25/00*      (2006.01)
(Continued)

(52) U.S. Cl.
CPC ......... *B41J 25/001* (2013.01); *B41J 2/04556* (2013.01); *B41J 2/04586* (2013.01);
(Continued)

(58) Field of Classification Search
CPC ................................. B41J 25/001; B41J 3/36
See application file for complete search history.

(56) References Cited

U.S. PATENT DOCUMENTS

2007/0076082 A1*  4/2007  Cook .................. B41J 3/36
                                              347/109
2007/0139507 A1   6/2007  Ahne et al.
(Continued)

FOREIGN PATENT DOCUMENTS

JP       63178065 A    7/1988
JP       01165263 A    6/1989
(Continued)

OTHER PUBLICATIONS

Extended European Search Report (EESR) dated Apr. 20, 2018 issued in counterpart European Application No. 17199016.1.
(Continued)

*Primary Examiner* — Scott A Richmond
(74) *Attorney, Agent, or Firm* — Holtz, Holtz & Volek PC

(57) ABSTRACT

A printing device includes a processor, a print head configured to perform a printing, and a sensor configured to detect a moving direction and a moving distance of the printing device. The processor is configured to perform processing of, while the printing device moves in a first direction, disabling the print head from performing the printing, and acquiring a first moving distance of the printing device in the first direction detected by the sensor, processing of, while the printing device moves in a second direction which is different from the first direction, determining that the print head has reached a printing start position when moving of a second moving distance based on the first moving distance of the printing device is detected by the sensor, and processing of, when it is determined that the print head has reached the printing start position, enabling the print head to start the printing.

6 Claims, 5 Drawing Sheets

1. ADJUST THE MARKER ON THE LEFT END OF THE CASE TO A PLACE AT WHICH IT IS INTENDED TO PERFORM THE PRINTING, AND THEN PUSH THE PRINTING INSTRUCTION BUTTON.

2. WHILE MOVING THE PRINTING DEVICE FROM THE RIGHT TO THE LEFT, SINCE THE MARKER IS TURNED ON WHEN THE HEAD REACHES THE PRINTING START POSITION, STOP THE PRINTING DEVICE.

3. WHEN SLIDING THE PRINTING DEVICE IN THE FORWARD DIRECTION (FROM THE LEFT TO THE RIGHT), THE PRINTING STARTS FROM THE PRINTING START POSITION.

4. WHEN THE MARKER IS TURNED OFF, THE PRINTING IS OVER.

(51) Int. Cl.
    *B41J 2/045*     (2006.01)
    *G06F 3/12*     (2006.01)
    *B41J 2/21*     (2006.01)

(52) U.S. Cl.
    CPC .............. *B41J 2/2135* (2013.01); *B41J 3/36* (2013.01); *G06F 3/121* (2013.01); *B41J 2/04505* (2013.01); *G06F 3/1203* (2013.01)

(56) References Cited

U.S. PATENT DOCUMENTS

| | | | |
|---|---|---|---|
| 2011/0109678 A1* | 5/2011 | Schwartz | B41J 3/36 347/14 |
| 2016/0082719 A1 | 3/2016 | Harada et al. | |

FOREIGN PATENT DOCUMENTS

| | | |
|---|---|---|
| JP | 02029359 A | 1/1990 |
| JP | 03158271 A | 7/1991 |
| JP | 05169730 A | 7/1993 |
| JP | 05330150 A | 12/1993 |
| JP | 09109467 A | 4/1997 |
| JP | 09300718 A | 11/1997 |
| JP | 10035034 A | 2/1998 |
| JP | 2852392 B2 | 2/1999 |
| JP | 2008055680 A | 3/2008 |
| JP | 2014210391 A | 11/2014 |

OTHER PUBLICATIONS

Japanese Office Action dated Jul. 3, 2018 (and English translation thereof) issued in counterpart Japanese Application No. 2016-247350.

* cited by examiner

FIG.4

1. ADJUST THE MARKER ON THE LEFT END OF THE CASE TO A PLACE AT WHICH IT IS INTENDED TO PERFORM THE PRINTING, AND THEN PUSH THE PRINTING INSTRUCTION BUTTON.

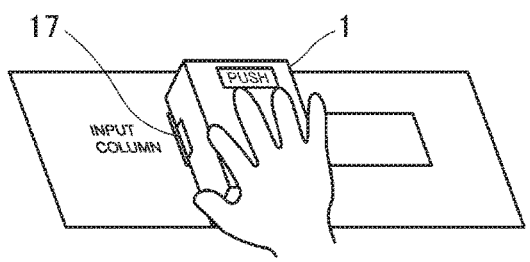

2. WHILE MOVING THE PRINTING DEVICE FROM THE RIGHT TO THE LEFT, SINCE THE MARKER IS TURNED ON WHEN THE HEAD REACHES THE PRINTING START POSITION, STOP THE PRINTING DEVICE.

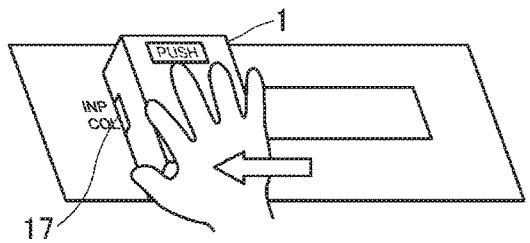

3. WHEN SLIDING THE PRINTING DEVICE IN THE FORWARD DIRECTION (FROM THE LEFT TO THE RIGHT), THE PRINTING STARTS FROM THE PRINTING START POSITION.

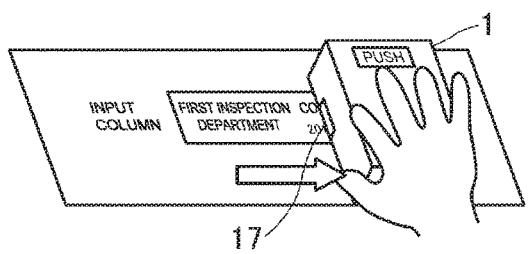

4. WHEN THE MARKER IS TURNED OFF, THE PRINTING IS OVER.

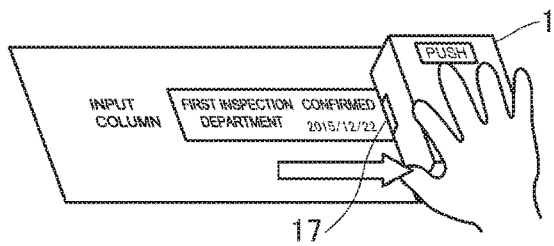

PRINTING DEVICE, PRINTING METHOD AND RECORDING MEDIUM

CROSS-REFERENCE TO RELATED APPLICATION

This application is based upon and claims the benefit of priority from the prior Japanese Patent Application No. 2016-247350, filed on Dec. 21, 2016, the entire contents of which are incorporated herein by reference.

BACKGROUND OF THE INVENTION

Field of the Invention

The present invention relates to a printing device, a printing method and a recording medium.

Description of the Related Art

In the related art, a manual scanning-type printing device has been known in which a user moves the printing device in user's hand on a printing target such as a sheet, a box or the like in a main scanning direction, thereby printing an arbitrary character string, a figure and the like on the printing target (JP-A-5-330150, JP-A-2008-55680).

The manual scanning-type printing device has merits in that it is not necessary to set a sheet and it is possible to freely perform the printing at a desired position on the printing target.

BRIEF SUMMARY OF THE INVENTION

The present invention has been made in view of the above situations, and an object thereof is to provide a printing device capable of improving an operability for performing a printing from a printing start position on a printing target.

According to an embodiment of the present invention, a printing device may include a processor, a print head configured to perform a printing, and a sensor configured to detect a moving direction and a moving distance of the printing device. The processor may be configured to perform processing of, while the printing device moves in a first direction, disabling the print head from performing the printing, and acquiring a first moving distance of the printing device in the first direction detected by the sensor, processing of, while the printing device moves in a second direction which is different from the first direction, determining that the print head has reached a printing start position when moving of a second moving distance based on the first moving distance of the printing device is detected by the sensor, and processing of, when it is determined that the print head has reached the printing start position, enabling the print head to start the printing.

According to an embodiment of the present invention, a printing method of a printing device may include processing of, while the printing device moves in a first direction, disabling a print head configured to perform a printing from performing the printing, and acquiring a first moving distance of the printing device in the first direction from a sensor configured to detect a moving direction and a moving distance, processing of, while the printing device moves in a second direction which is different from the first direction, determining that the print head has reached a printing start position when moving of a second moving distance based on the first moving distance of the printing device is detected by the sensor, and processing of, when it is determined that the print head has reached the printing start position, enabling the print head to start the printing.

According to an embodiment of the present invention, a recording medium may have a program recorded therein. The program may be configured to enable a processor of a printing device to execute processing of, while the printing device moves in a first direction, disabling a print head configured to perform a printing from performing the printing, and acquiring a first moving distance of the printing device in the first direction from a sensor configured to detect a moving direction and a moving distance, processing of, while the printing device moves in a second direction which is different from the first direction, determining that the print head has reached a printing start position when moving of a second moving distance based on the first moving distance of the printing device is detected by the sensor, and processing of, when it is determined that the print head has reached the printing start position, enabling the print head to start the printing.

BRIEF DESCRIPTION OF THE SEVERAL VIEWS OF THE DRAWING

FIG. 4 illustrates operations of the printing device in accordance with the embodiment of the present invention.

DETAILED DESCRIPTION OF THE INVENTION

Figure 1:
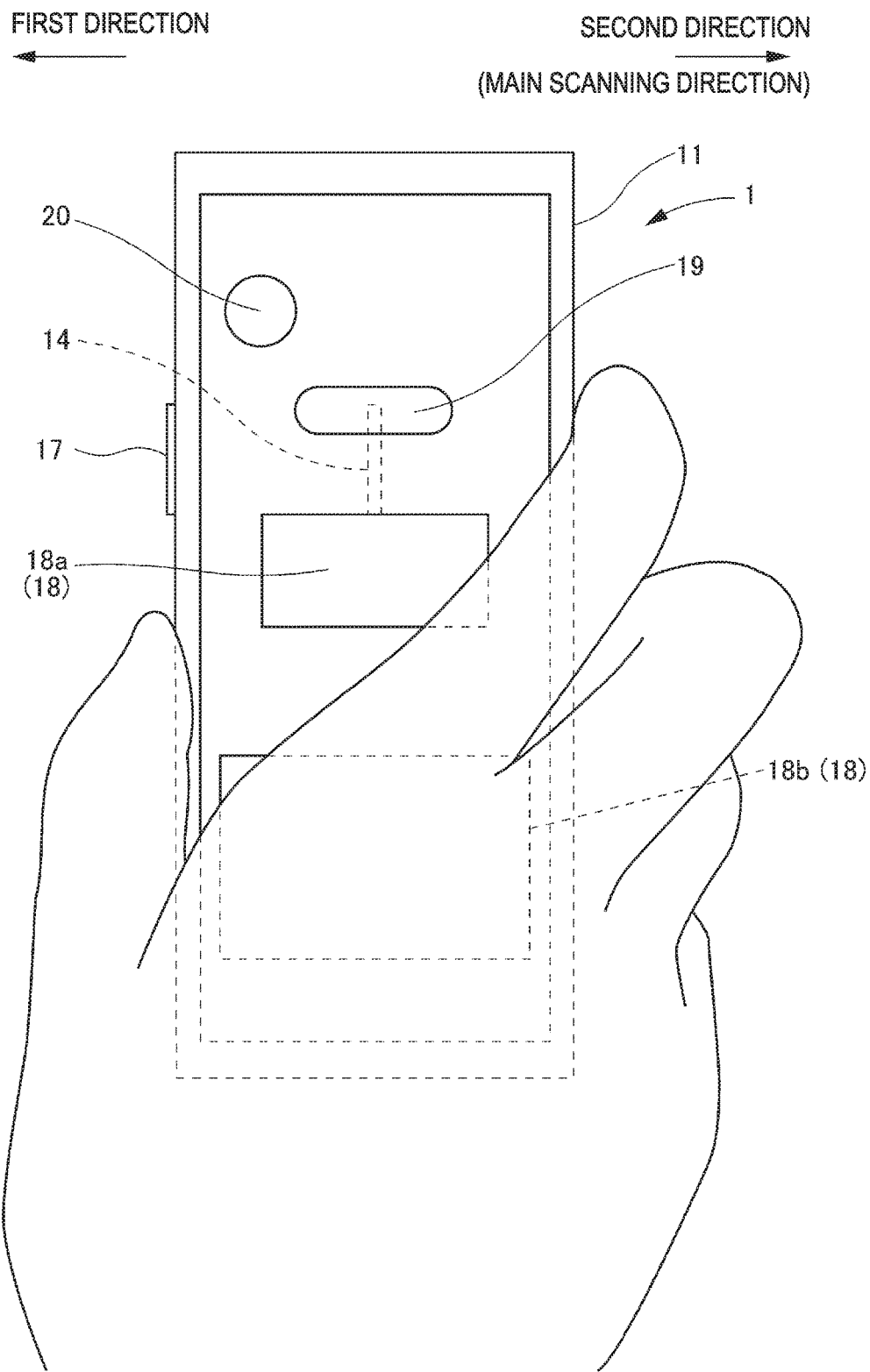
FIG. 1 is a plan view of a printing device in accordance with an embodiment of the present invention.

Hereinafter, an embodiment of the present invention will be described in detail with reference to the accompanying drawings. Meanwhile, in the descriptions of the embodiment, the same elements are denoted with the same reference numerals.

[Configuration of Printing Device]

Figure 2:
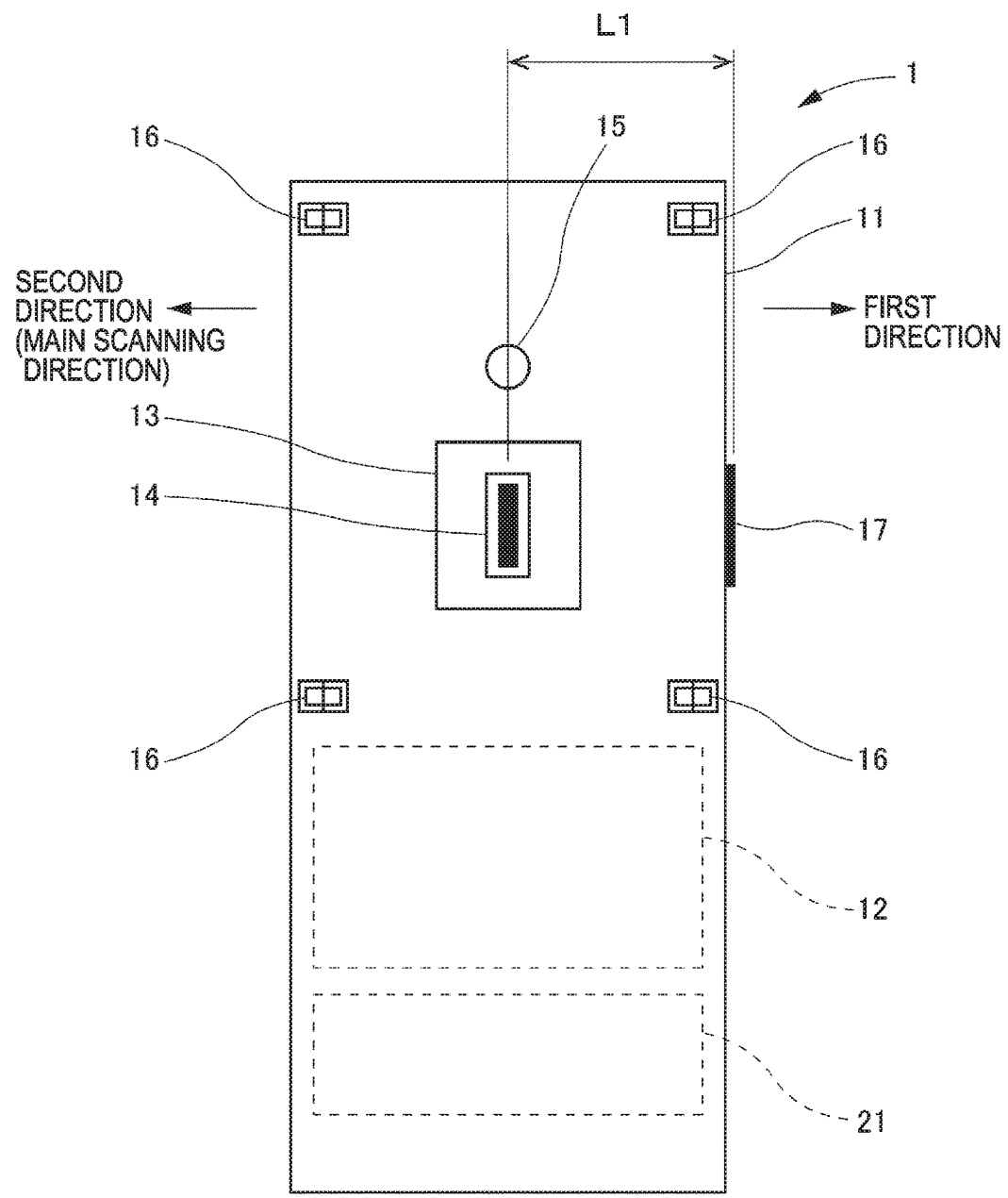
FIG. 2 is a bottom view of the printing device in accordance with the embodiment of the present invention.

FIG. 1 is a plan view of a printing device 1 in accordance with an embodiment of the present invention, and FIG. 2 is a bottom view of the printing device 1 in accordance with the embodiment of the present invention.

The printing device 1 is a manual scanning-type printing device (handy printer) configured to perform a printing on a printing medium such as a sheet as a user manually moves the same in a main scanning direction.

The main scanning direction indicates a moving direction when the printing device 1 performs the printing. In the embodiment, the main scanning direction is a rightward direction in FIG. 1, and is also referred to as a second direction. Also, an opposite direction to the second direction, i.e., a leftward direction in FIG. 1 is referred to as a first direction.

As shown in FIGS. 1 and 2, the printing device 1 includes a case 11, a substrate 12, an ink cartridge 3 having a print head 14, an optical sensor 15, guide rollers 16, a printing start position marker 17, a user interface 18, a printing instruction button 19, a power supply button 20 and an embedded power supply 21.

The case 11 is a housing for accommodating therein the substrate 12, the ink cartridge 13, the optical sensor 15, the embedded power supply 21 and the like.

Figure 3:
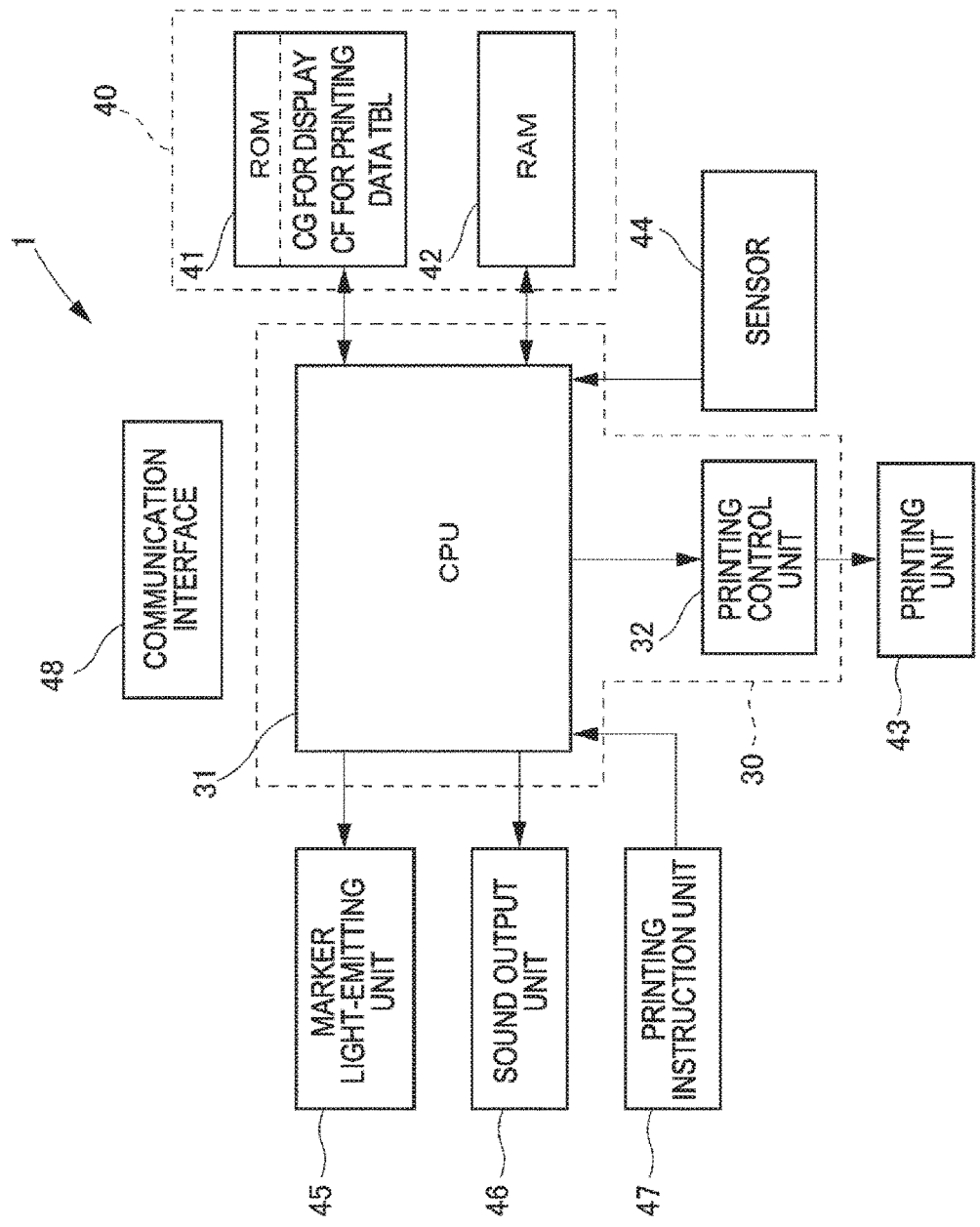
FIG. 3 is a block diagram depicting a functional configuration of the printing device in accordance with the embodiment of the present invention.

The substrate 12 is mounted thereon with a CPU 31, a RAM 42, a R 41 and the like (refer to FIG. 3).

The respective functions of the CPU 31, the RAM 42 and the ROM 41 will be described later.

The ink cartridge 13 is configured to store therein ink, and is integrally provided with the print head 14 configured to discharge the ink to a printing medium for printing. The ink cartridge 13 is provided for the printing device 1 so that the print head 14 is positioned on a surface (a bottom surface, here) facing the printing medium.

The print head 14 has a plurality of nozzles (also referred to as a nozzle row) arranged in one line in a direction perpendicular to the main scanning direction, and the ink is discharged from the nozzles.

When performing a color printing, nozzle rows of multiple colors (for example, cyan, magenta and yellow) are arranged side by side in the main scanning direction.

Also, the nozzle row is not necessarily required to be provided in one line for each color. For example, nozzle rows corresponding to the same color may be provided side by side in the main scanning direction.

In the meantime, the printing device 1 may have a detachable cap for preventing the ink attached to the print head 14 from being dried.

Also, the printing device 1 may further have a cradle for placing thereon the printing device 1 when the printing device is not used, so as to prevent the ink attached to the print head 14 from being dried, for example, as an adjunct to the printing device 1.

The optical sensor 15 is a sensor 44 (refer to FIG. 3) configured to detect a moving direction and a moving distance of the printing device 1, and may be an optical sensor that is used for a mouse for a PC having a laser or LED and can detect a moving direction and a moving distance, for example.

In the embodiment, the optical sensor 15 is provided so that a measuring unit for detecting a moving direction and a moving distance is positioned at a bottom surface-side of the printing device 1.

The sensor 44 is not limited to the optical sensor and may be a rotary encoder-type sensor.

The guide rollers 16 are provided at the bottom surface-side of the printing device 1, and are configured to smoothly move the printing device 1 in the first direction and the second direction (i.e., the leftward and rightward directions in FIG. 1) with being in contact with the printing medium.

In the embodiment, the four guide rollers 14 are provided to surround the print head 14 on the bottom surface of the printing device 1. The guide rollers 16 are rotated in the first direction or the second direction with being in contact with the printing medium, so that a linear moving operation of the printing device 1 in the first direction and the second direction can be easily performed by the user.

The printing start position marker 17 is a marker when the user arranges the printing device 1 on the printing medium upon the printing.

Herein, in a situation where the printing device 1 is scanned rightward upon the printing, when the printing device 1 is adjusted to a left end, which becomes a printing start position, of an edge line of an entry column, for example, it may be considered to provide the printing start position marker 17 at a right end position of the case 11 in front of the print head 14 with respect to the main scanning direction (second direction). However, in the embodiment, to the contrary, the printing start position marker 17 is provided at a left end position of the case 11 at the rear of the print head 14 with respect to the main scanning direction.

Therefore, a right-handed user can see a left surface of the printing device 1 held with a right hand simply by slightly inclining a user face leftward. Thus, even though the user does not take a posture of inclining the entire body rightward, like a case of seeing a right surface of the printing device 1 held with the right hand, the user can positionally adjust the printing start position marker 17 to the printing start position of the printing medium. As a result, it is possible to considerably improve the operability.

In this case, however, the print head 14 is already positioned in the entry column at the state where the printing start position marker 17 is positionally adjusted to the printing start position of the printing medium. At this state, a using method after the position adjustment of the printing device 1 for staring the printing by using the left end of the entry column as the printing start position will be described later.

Also, the printing start position marker 17 has a marker light-emitting unit 45 (refer to FIG. 3) configured by a light source such as an LED, and is configured to be turned on/off.

The printing start position marker has a function of guiding an operation of the printing device 1 by turning on and off the light of the marker light-emitting unit 45, too.

In the meantime, a width of the printing start position marker 17 in the direction perpendicular to the main scanning direction is preferably the same as a printing width of the print head 14 so that the user can correctly perceive a printing width (character height) of a figure character (a character, a symbol, a mark and the like).

The user interface 18 is an interface with a user, and includes a display unit 18a configured by a liquid crystal screen and the like, an operation unit 18b configured by a ten-key and the like, and a sound output unit 46 (refer to FIG. 3) configured by a buzzer and the like.

In the meantime, the display unit 18a or the sound output unit 46 may be configured to function as a use guide unit for guiding a user's operation by display or sound, an error notification unit for notifying occurrence of an error by display or sound, and the like.

Also, the operation unit 18b may be configured to function as a printing setting unit for performing an input and selection of a character image to be printed, a setting of printing conditions, and the like.

Also, the user interface 18 includes an external connection port to which a wireless unit capable of performing communication with an external terminal (for example, a portable phone, a smart phone, a tablet terminal, a PC and the like), such as Wi-Fi, and a detachable storage medium such as a USB memory and an SD card can be mounted.

Therefore, printing data (template) that is to be printed with the printing device 1 may be prepared with the external terminal under favorable preparation environments, not with the printing device 1, and the printing data prepared with the external terminal may be read by the printing device 1.

The printing instruction button 19 is an operation button by which the user instructs a printing to the printing device 1.

The power supply button 20 is an operation button by which the user turns on/off a power supply of the printing device 1.

The embedded power supply 21 is a dry-cell battery, a secondary battery or the like becoming a power supply of the printing device 1.

[Functional Configuration of Printing Device]

A functional configuration and the like of the printing device 1 are described with reference to FIG. 3.

FIG. 3 is a block diagram depicting a functional configuration of the printing device 1 in accordance with the embodiment of the present invention.

As shown in FIG. 3, the printing device 1 includes functional units such as a processor 30, a memory 40, a printing unit 43, the sensor 44, the marker light-emitting unit 45, the sound output unit 46, a printing instruction unit 47, a communication interface 48 and the like.

Since the sensor 44, the marker light-emitting unit 45 and the sound output unit 46 have been described in the above, the overlapping descriptions thereof are omitted.

The processor 30 is a functional unit configured to control an entire operation of the printing device 1, and include a CPU 31, a printing processor 32 and the like.

The CPU 31 is configured to perform processing of receiving a printing instruction from the printing instruction unit 47 configured by the printing instruction button 19, determining a printing content on the basis of various data stored in the ROM 41 and the RAM 42 and instructing the printing processor 32 to perform a printing, for example.

The printing processor 32 is configured to transfer a content of printing data (printing buffer) stored in the RAM 42 to the printing unit 43 (which will be described later) in correspondence to a moving direction and a moving distance of the printing device 1 detected by the sensor 44, and to enable the printing unit 43 to execute a printing.

The detailed operations of the processor 30 will be described later.

The memory 40 includes the RAM 42 and the ROM 41.

The RAM 42 is configured to temporarily store therein data, which is to be used for calculation in the CPU 31, and printing data, which is to be output to the printing unit 43.

The ROM 41 is configured to store therein data such as figure characters (including a character, a symbol and a picture character), size information of the figure characters, a printing data table, diverse programs and the like for implementing each function of the printing device 1.

The printing unit 43 is a functional unit for performing a printing on the printing medium, and is configured by the ink cartridge 13 having the print head 14, in the embodiment.

The printing instruction unit 47 is the printing instruction button 19. When the user operates the printing instruction button 19, the processor 30 starts control associated with the printing.

The communication interface 48 is a part of the user interface 18, and is an interface for receiving diverse data (for example, printing data (template) and the like) and programs from a terminal device such as a PC or a smart phone.

Specifically, as described above, the external connection port to which the wireless unit of Wi-Fi, the USB memory and the like are to be mounted can be exemplified.

[Operations of Printing Device]

In the below, operations of the printing device 1, which are implemented by the processing to be executed by the processor 30, are described with reference to FIG. 4.

It is assumed that the printing data to be printed by the printing device 1 is prepared in a terminal device having a printing data preparation application such as a PC, a smart phone and the like and is registered in advance in the printing device 1.

FIG. 4 illustrates operations of the printing device 1 in accordance with the embodiment of the present invention.

In the meantime, FIG. 4 depicts an operation example when a character string is printed rightward (the main scanning direction, the second direction) from a left end portion of an input column of the printing medium.

The user positionally adjusts the printing device 1 so that the main scanning direction is parallel with the input column and a printing start position (left end portion) of the input column and a position of the printing start position marker 17 are matched.

At this time, since the printing start position marker 17 is arranged at the left end portion of the printing device 1, even when the user a right-handed user, the user can positionally adjust the printing start position marker 17 to the printing start position of the printing medium with a comfortable posture of seeing the left surface of the printing device 1 held with the right hand.

When the position adjustment of the printing device 1 to the printing medium is completed, the user pushes the printing instruction button 19, and starts a manual moving operation of the printing device 1.

At the start time of the moving operation, since the print head 14 of the printing device 1 is positioned further rightward (ahead of the main scanning direction) than the printing start position of the printing medium by a first distance L1 (a distance between the printing start position marker 17 and the print head 14 in the main scanning direction), the user first moves the printing device 1 leftward (the first direction) so as to return the print head 14 to the printing start position of the printing medium.

When the printing instruction button 19 is pushed, the processor 30 performs processing of acquiring a first moving distance L2 in the leftward direction (the first direction) from the sensor 44 at a state where the print head 14 is not yet instructed to perform a printing, processing of determining whether the first moving distance L2 has reached the first distance L1, i.e., the print head 14 has reached the printing start position of the printing medium, and processing of, when the print head 14 has reached the printing start position of the printing medium, notifying the user of the fact (for example, turning on the marker light-emitting unit 45 and outputting a sound from the sound output unit 46).

In the meantime, after the printing instruction button 19 is pushed until the notification is executed, the processor 30 may display the moving operation direction (the first direction) of the printing device 1 with an arrow or the like on the display unit 18a.

Also, the method of notifying the user that the print head 14 has reached the printing start position of the printing medium is not particularly limited. For example, only a buzzer sound may be used.

When the user checks the notification, the user stops the leftward moving of the printing device 1.

At this time, the position of the print head 14 is not necessarily required to be matched with the printing start position of the printing medium, and is favorably located further leftward (the first direction) than the printing start position of the printing medium.

After stopping the leftward moving of the printing device 1, the user starts a moving operation of the printing device 1 in the rightward direction (the main scanning direction, the second direction).

When the printing device 1 starts to move rightward (the main scanning direction, the second direction), the processor 30 performs processing of acquiring the first moving distance L2 determined from the sensor 44, processing of acquiring a second moving distance L3 in the rightward direction (the second direction) from the sensor 44 at a state where the print head 14 is not yet instructed to perform a printing, processing of determining whether the print head 14 has reached the printing start position of the printing medium (i.e., determining whether the second moving distance L3 is L3=L2−L1) on the basis of the first distance L1, the first moving distance L2 and the second moving distance L3, processing of, when the print head 14 has reached the printing start position of the printing medium, enabling the print head 14 to start a printing, processing of determining an end of the printing, and processing of notifying the user of the end of the printing (for example, turning off the marker light-emitting unit 45 and outputting a sound from the sound output unit 46).

In the meantime, the processor 30 may display the moving operation direction (the main scanning direction, the second direction) of the printing device 1 with an arrow or the like on the display unit 18*a* during the lighting of the marker light-emitting unit 45.

Also, the method of notifying the user of the end of the printing is not particularly limited. For example, only a buzzer sound may be used.

[Processing Sequence of Processor]

Subsequently, a control sequence (a printing method and a program) of the printing device 1, which is to be executed by the processor 30 configured to implement the operations of the printing device 1, is described in more detail with reference to a flowchart of FIG. 5.

Figure 5:
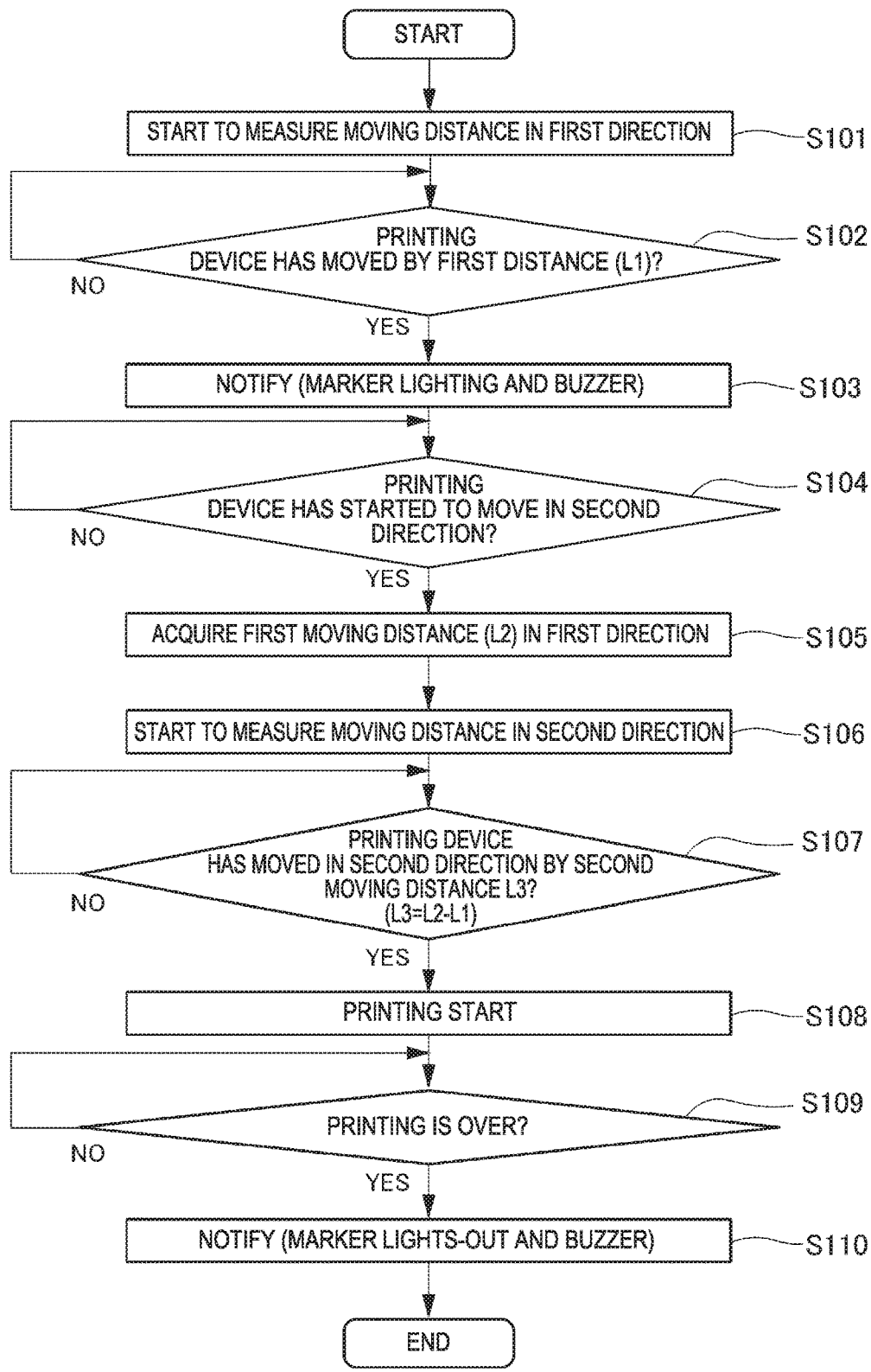
FIG. 5 is a flowchart depicting a control sequence of the printing device in accordance with the embodiment of the present invention.

FIG. 5 is a flowchart depicting a control sequence of the printing device 1 in accordance with the embodiment of the present invention.

In the meantime, it is assumed that before the control based on the flowchart of FIG. 5 starts, the printing data is read by the printing device 1 through the communication interface 48 and the printing data is stored as the printing buffer corresponding to the moving distance in the RAM 42.

For this reason, the contents of the printing buffers corresponding to the moving distances are sequentially transferred to the print head 14, in correspondence to the moving distances detected by the optical sensor 15 (the sensor 44). Thereby, a state where it is possible to execute a printing on the printing medium is formed.

When the power supply button 20 is operated by the user, the printing device 1 is activated, and when the printing instruction button 19 is operated by the user, the processor 30 executes control processing shown in FIG. 5.

In the meantime, the printing instruction button 19 is a button for instructing start of the printing after the printing start position marker 17 is positionally adjusted to the printing start position. Therefore, when the user operates the printing instruction button 19, the printing device 1 is disposed as shown in an upper view of FIG. 4.

As shown in FIG. 5, when the printing instruction button 19 is operated, the processor 30 starts to measure the moving distance of the printing device 1 in the first direction (S101).

Specifically, the processor executes processing of acquiring the first moving distance L2 in the first direction from the sensor 44.

Then, the processor 30 determines whether the first moving distance L2 has reached the first distance L1 (refer to FIG. 2), i.e., the print head 14 has reached the printing start position of the printing medium (S102).

This determination step is repeated until a result of the determination is YES.

When it is determined in step S102 that the first moving distance L2 has reached the first distance L1, the processor 30 notifies the user of the fact (S103).

Specifically, the processor turns on the marker light-emitting unit 45 and outputs a warning sound from the sound output unit 46.

Then, the processor 30 determines whether the printing device 1 has started to move in the second direction (step S104).

This determination step is repeated until a result of the determination is YES.

Specifically, the processor 30 determines whether the printing device 1 has started to move in the second direction by determining whether the moving direction acquired from the sensor 44 has changed into a direction (more specifically, an opposite direction) different from the first direction.

When it is determined in step S104 that the printing device 1 has started to move in the second direction, the processor 30 acquires the first moving distance L2 determined from the sensor 44 (S105) and then starts to measure the moving distance of the printing device 1 in the second direction (S106).

Specifically, the processor executes processing of acquiring the second moving distance L3 in the second direction from the sensor 44.

Then, the processor 30 determines whether the print head 14 has reached the printing start position of the printing medium on the basis of the first distance L1, which is a distance between the printing start position marker 17 (a marker for adjustment to the printing start position) and the print head 14, the first moving distance L2 and the second moving distance L3 (S107).

Specifically, the second moving distance L3 at which the print head 14 reaches the printing start position of the printing medium can be defined as a distance obtained by subtracting the first distance L1, which is a distance between the printing start position marker 17 (a marker for adjustment to the printing start position) and the print head 14, from the first moving distance L2. Therefore, the processor determines whether the second moving distance L3 is the same as the distance obtained by subtracting the first distance L1 from the first moving distance L2.

This determination step is repeated until a result of the determination is YES.

When it is determined in step S107 that the second moving distance L3 is the same as the distance obtained by subtracting the first distance L1 from the first moving distance L2, the processor 30 enables the print head 14 to start a printing (S108).

Then, the processor 30 determines whether the printing is over (S109).

For example, the processor can determine whether the printing buffer remains and determine that the printing is over when there is no remaining printing buffer.

This determination step is repeated until a result of the determination is YES.

When it is determined in step S109 that the printing is over, the processor 30 notifies the user of the fact (S110).

Specifically, the processor turns off the marker light-emitting unit 45 and outputs a warning sound from the sound output unit 46.

By the above processes, the control sequence that is executed in one printing processing is over.

When the control is performed as described above, even though the printing start position marker 17 is provided at the left end position of the case H, which is located further rearward than the print head 14 with respect to the main scanning direction, it is possible to start the printing from the appropriate printing start position.

Although the printing device 1 of the present invention has been described on the basis of the specific embodiment, the present invention is not limited to the specific embodiment.

For example, in the above embodiment, the printing start position marker 17 is provided at the left end position of the case 11. However, the printing start position marker 17 may be additionally provided at a right end position of the case 11.

That is, the printing start position marker 17 may be provided at both right and left sides of the case 11.

According to this configuration, since the printing start position marker 17 is provided at the right side of the case 11, too, when the main scanning direction upon the printing is a leftward direction and it is desired to positionally adjust the printing device 1 to a right end of the entry column, a left-handed user can easily perform the corresponding operation.

In this case, the first direction may be the rightward or leftward direction. However, a primary moving direction, which is detected by the sensor 44 as the printing instruction button 19 is operated, may be defined as the first direction.

Meanwhile, in the above embodiment, the main scanning direction, which is considered to be general upon the printing, is the rightward direction. However, the main scanning direction may be an upper and lower direction, i.e., the first direction may be an upward or downward direction, and the second direction may be a downward or upward direction opposite thereto.

Also, in the above embodiment, considering the position adjustment of the printing start position marker 17, the scanning is first performed in the first direction and is then performed in the second direction, which is the main scanning direction (the scanning direction in which the ink is to be discharged), upon the printing. However, depending on the using aspects, there may be a case where it is intended to perform the scanning in the main scanning direction for printing immediately after the printing start position marker 17 is positionally adjusted.

Therefore, the printing device 1 is preferably configured to select an option for performing the scanning in the main scanning direction (the scanning direction in which the ink is to be discharged) for printing immediately after the printing start position marker 17 is positionally adjusted and an option for performing the scanning in the first direction and then in the second direction (the main scanning direction) for printing.

Also, in the above embodiment, the printing device 1 is an inkjet printer. However, the printing device 1 may be a thermal head printer of which the print head 14 is configured by a heat generation member or may be a printer of other type.

Like this, the present invention is not limited to the embodiment, and a variety of modifications and improvements are also included in the technical scope of the present invention, which are obvious to one skilled in the art from the claims.

In the below, the inventions defined in the claims first attached to the subject application are additionally described. The numbers of the claims in the additional description are the same as the claims first attached to the subject application.

1: printing device
11: case
14: print head
15: optical sensor
16: guide roller
17: printing start position marker
19: printing instruction button
30: processor
44: sensor
45: marker light-emitting unit
46: sound output unit

The invention claimed is:

1. A printing device comprising:
a processor;
a print head configured to perform printing;
a marker for guiding operation of the printing device, a distance between the print head and the marker being defined as a first distance; and
a sensor configured to detect a moving direction and a moving distance of the printing device,
wherein the processor is configured to perform:
processing of, when a print instruction is received, setting a printing start position based on a position of the marker at a time at which the print instruction is received,
processing of, while the printing device moves in a first direction, disabling the print head from performing the printing, and acquiring a first moving distance of the printing device in the first direction detected by the sensor,
processing of, while the printing device moves in a second direction which is different from the first direction, determining that the print head has reached the printing start position when a second moving distance of the printing device in the second direction is detected by the sensor, the second moving distance being a distance obtained by subtracting the first distance from the first moving distance, and
processing of, when it is determined that the print head has reached the printing start position, enabling the print head to start the printing.

2. The printing device according to claim 1, wherein the processor controls to notify a user when the printing device has moved by the first distance in the first direction.

3. The printing device according to claim 1, wherein when the printing by the print head is completed, the processor notifies a user of completion of the printing.

4. The printing device according to claim 1, further comprising a housing configured to accommodate therein the processor, the print head, and the sensor,
wherein the housing is provided with a guide roller configured to contact a printing medium and to rotate in the first direction and the second direction.

5. A printing method of a printing device, the printing device comprising a print head configured to perform printing, a marker for guiding operation of the printing device, and a sensor configured to detect a moving direction and a moving distance of the printing device, and the printing method comprising:
processing of, when a print instruction is received, setting a print start position based on a position of the marker at a time at which the print instruction is received;
processing of, while the printing device moves in a first direction, disabling the print head from performing the printing, and acquiring a first moving distance of the printing device in the first direction from the sensor;
processing of, while the printing device moves in a second direction which is different from the first direction, determining that the print head has reached the printing start position when a second moving distance of the printing device in the second direction is detected by the sensor, the second moving distance being a distance obtained by subtracting a first distance from the first moving distance, and the first distance being a distance between the print head and the marker; and processing of, when it is determined that the print head has reached the printing start position, enabling the print head to start the printing.

6. A non-transitory recording medium having a program recorded therein, the program being executable by a processor of a printing device, the printing device comprising a print head configured to perform printing, a marker for guiding operation of the printing device, and a sensor configured to detect a moving direction and a moving distance of the printing device, and the program controlling the processor to execute:

processing of, when a print instruction is received, setting a print start position based on a position of the marker at a time at which the print instruction is received;

processing of, while the printing device moves in a first direction, disabling the print head from performing the printing, and acquiring a first moving distance of the printing device in the first direction from the sensor;

processing of, while the printing device moves in a second direction which is different from the first direction, determining that the print head has reached the printing start position when a second moving distance of the printing device in the second direction is detected by the sensor, the second moving distance being a distance obtained by subtracting a first distance from the first moving distance, and the first distance being a distance between the print head and the marker; and processing of, when it is determined that the print head has reached the printing start position, enabling the print head to start the printing.

* * * * *